H. J. SMITH.
MOUNTING FOR WHEELS.
APPLICATION FILED JAN. 30, 1920.
1,418,404.
Patented June 6, 1922.
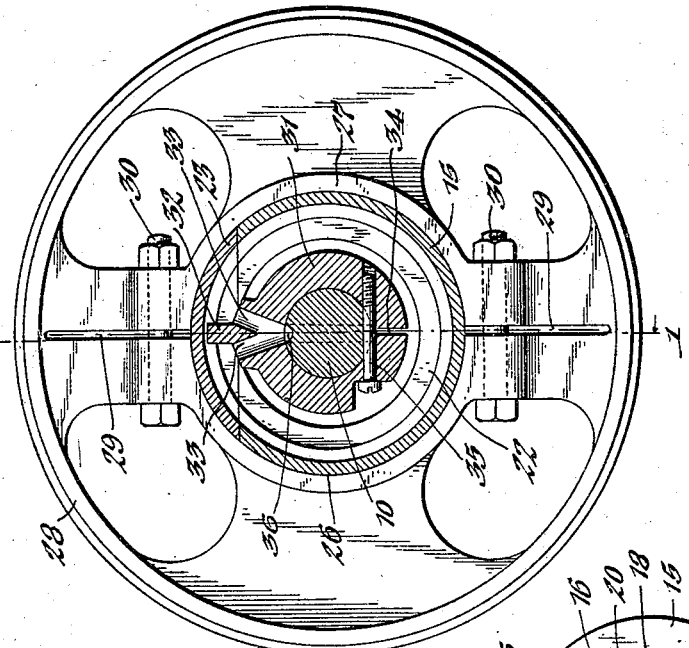
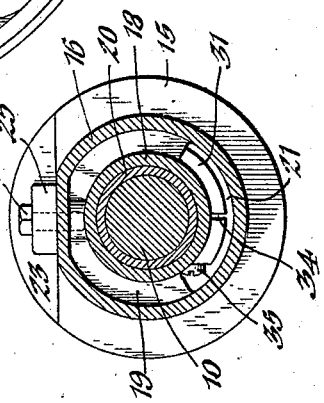
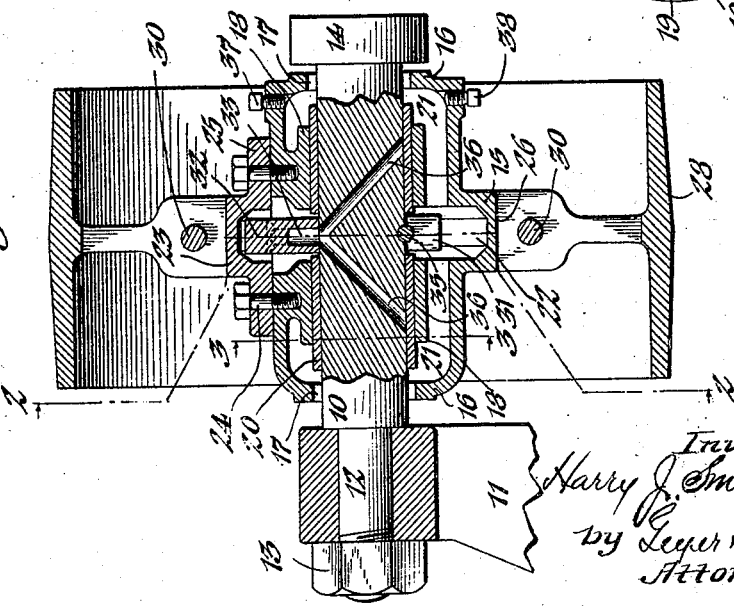

UNITED STATES PATENT OFFICE.

HARRY J. SMITH, OF LAKEWOOD, OHIO.

MOUNTING FOR WHEELS.

1,418,404. Specification of Letters Patent. Patented June 6, 1922.

Application filed January 30, 1920. Serial No. 355,264.

*To all whom it may concern:*

Be it known that I, HARRY J. SMITH, a citizen of the United States, residing at Lakewood, in the county of Cuyahoga and State of Ohio, have invented new and useful Improvements in Mountings for Wheels, of which the following is a specification.

This invention relates to a mounting for wheels such as pulleys and gear wheels which are adapted to turn on a relatively stationary arbor, pin or axle, a particular instance being the pulleys of belt tighteners in which the pulley engages the belt and moves bodily to an extent sufficient to put the belt under the desired tension or produce the desired wrap of the belt around one of the belt pulleys.

It is the object of this invention to produce a mounting for wheels or pulleys working more particularly under these conditions which will insure an efficient lubrication of the co-operating bearing surfaces notwithstanding that the arbor or support of the pulley is turned a considerable extent out of a normal central position and thus causing the pulley to run properly and efficiently without causing undue wear or frequent attention so far as replenishing the same with lubricant is concerned.

In the accompanying drawings:

Figure 1 is a vertical longitudinal section on line 1—1, Fig. 2, of a wheel mounting embodying my invention. Figure 2 is a transverse section of the same taken on line 2—2, Fig. 1. Figure 3 is a transverse section taken on line 3—3, Fig. 1 with the body of the wheel omitted.

Similar characters of reference indicate corresponding parts throughout the several views.

10 represents a supporting arbor, pin or axle which is arranged horizontally and upon the cylindrical surface of which a wheel such as the pulley of a belt tightener or a gear wheel working under analogous conditions is journaled to turn. This arbor is relatively stationary and may be mounted on an arm 11 which is either fixed or capable of turning to a limited extent in a plane at right angles to the axis of the arbor. In the construction shown in the drawings the arbor is provided at one end with a reduced shank 12 which is secured in an opening in the arm by a screw nut 13 while the other end of the same is provided with a head 14.

On the periphery of the arbor is journaled the hub of the wheel which in its preferred form comprises a hollow or tubular body 15 which serves as an oil chamber and the opposite ends of which are provided with heads 16 having central openings 17 so that the arbor can project lengthwise through the hub body. Within the hub body are two bearings or sleeves 18 which are arranged axially in line with the axis of the body and have their inner opposing ends separated by an intervening space while their outer ends are spaced from the corresponding end heads 16 of the hub body. The two bearing sleeves are connected on one side by a web 19 with the hub body so that communication is established between all parts of the chamber within the hub body, said body, bearing sleeves and webs being preferably cast of metal in one piece. Each of the bearing sleeves is preferably provided in its bore with a tubular lining or bushing 20 of suitable metal whereby the hub of the wheel turns on the arbor.

The opposite end portions 21 of the hub chamber are contracted while the central part thereof is enlarged forming an annular well 22 between the reduced parts of the chamber which is in line with the space between the bearing sleeves and into which the oil dropping from the bearing surfaces between the arbor and the bearing sleeves is conducted by the reduced end portions of the oil chamber. On one side the hub body is provided with a removable section 23 which forms a cover for an opening in the side of the well through which access may be had to the interior thereof for introducing into the hub the means whereby the oil is picked up from the well and directed to the co-operating bearing surfaces of the arbor and wheel hub. The cover is preferably detachably secured in place by means of screws 24 passing through external lugs 25 on the cover and into the adjacent part of the body of the hub.

The outer side of the enlarged central part of the hub body and its cover has its periphery constructed to form an annular seat 26 which is concentric with the axis of the hub and arbor. With this seat engages the central clamping sleeve 27 of the wheel or pulley body, the latter in the present instance having a circular rim 28 which is adapted to engage a belt and which is connected by arms with said clamping sleeve. The body of the pulley may be secured to

adjacent arms being split radially, and clamping bolts connecting those portions of said arms on opposite sides of the split therein.

4. A wheel mounting comprising a relatively stationary horizontal arbor, a hollow hub which is journaled on said arbor, one part of the cavity within the hub being of larger diameter than another part and forming an oil well, a directing device mounted on said arbor within said well and adapted to intercept the oil in the latter and direct the same to the bearing surfaces between said arbor and hub, and a wheel rim provided with a sleeve which is secured upon said hub, the upper part of said hub being separable from the lower part thereof to afford access to the interior of the hub.

HARRY J. SMITH.